United States Patent [19]

Lindner et al.

[11] Patent Number: 4,959,418

[45] Date of Patent: Sep. 25, 1990

[54] POLYMERS IN PARTICLE FORM WITH IMPROVED PROPERTIES, FOR THE PREPARATION OF THERMOPLASTIC MOULDING MATERIALS

[75] Inventors: Christian Lindner, Cologne; Karl-Heinz Ott, Leverkusen; Dieter Wittmann, Krefeld; Hans-Eberhard Braese, Cologne, all of Fed. Rep. of Germany

[73] Assignee: Bayer Aktiengesellschaft, Leverkusen, Fed. Rep. of Germany

[21] Appl. No.: 897,348

[22] Filed: Aug. 18, 1986

[30] Foreign Application Priority Data

Aug. 29, 1985 [DE] Fed. Rep. of Germany ....... 3530818

[51] Int. Cl.$^5$ ................... C08F 265/04; C08F 265/06; C08F 265/10

[52] U.S. Cl. ..................................... 525/282; 525/287; 525/292; 525/293; 525/302; 525/304; 525/305

[58] Field of Search ............... 525/302, 304, 309, 282, 525/287, 293, 305, 292

[56] References Cited

U.S. PATENT DOCUMENTS 4,351,921 9/1982 Kishida et al. ...................... 525/302

FOREIGN PATENT DOCUMENTS 2060662 5/1981 United Kingdom .................. 525/85

*Primary Examiner*—Jacob Ziegler
*Attorney, Agent, or Firm*—Connolly and Hutz

[57] ABSTRACT

Polymer powders and thermoplastic moulding materials with improved properties are obtained if graft polymers and/or resins in particle form are used and small amounts of rubber-like polymers are polymerized or graft-polymerized onto their particle surfaces.

19 Claims, No Drawings

POLYMERS IN PARTICLE FORM WITH IMPROVED PROPERTIES, FOR THE PREPARATION OF THERMOPLASTIC MOULDING MATERIALS

The invention relates to polymers in particle form, their preparation and their use as thermoplastics. Polymers in particle form are usually prepared by emulsion polymerization; this particularly applies to graft polymers of resin-forming monomers on rubber. The polymers can be obtained from the polymer emulsions—especially in the case of graft polymerization—as powders, which can then be processed as thermoplastics to shaped articles, if appropriate after mixing with brittle resins (such as styrene/acrylonitrile copolymers or polyvinyl chloride).

The properties and the quality of the polymer powders used are decisive for the properties of the final products: the powders must be purified and dehydrated sufficiently, easy to handle and readily dispersible in viscous thermoplastic melts.

It has been found that polymer powders and thermoplastic moulding materials with improved properties can be obtained if graft polymers and/or resins in particle form, onto the particle surfaces of which small amounts of rubber-like polymers are polymerized or graft-polymerized in a particular manner, are used.

The invention thus relates to (1) resinous polymers in particle form of 90–99% by weight of a core material of a homo- or copolymer of resin-forming monomers and 10–1% by weight of rubber-like homo- or copolymers with glass transition temperatures of less than 30° C. polymerized onto the surface of the resin particles and (2) graft polymers in particle form of a core (a), of a diene, olefine and/or alkyl acrylate rubber, of a grafted shell (b), of a homo- or copolymer of resin-forming monomers and 10–1% by weight, based on the sum of (a) and (b), of a rubber-like homo- or copolymer with glass transition temperatures of less than 30° C. polymerized onto the surface of the graft polymer particles.

Preferred polymers in particule form have a weighted average particle diameter ($d_{50}$ value) of 0.08 to 1.5 $\mu$m, most preferably 0.09–0.6 $\mu$m and consist of 93–99, in particular 96–99% by weight of core material, which is a homo- such as copolymer of resin-forming monomers in the case of the resinous polymers and is the sum of material (a) and (b) in the case of graft polymers, and of 7–1, in particular 4–1% by weight of rubber polymerized on, preferably with glass transition temperatures of less than 10° C., in particular less than −10° C.

The resinous polymers in the polymers according to the invention are homo- or copolymers of resin-forming $\alpha,\beta$-unsaturated polymerizable monomers, such as styrene, $\alpha$-methylstyrene, p-methylstyrene, halogenostyrene, $C_{1-8}$-alkyl methacrylates, acrylonitrile, methacrylonitrile, maleimides and vinyl chloride.

The rubber-like homo- or copolymers polymerized on in the polymers according to the invention are derived from monomers for the series comprising acrylic acid alkyl esters with up to 8 C atoms in the alcohol part, diene monomers, such as butadiene, isoprene and chloroprene, and carboxylic acid vinyl esters, in particular from alkyl acrylates, and butadiene, and can contain, if appropriate, up to 50% by weight, in particular up to 30% by weight, of comonomers, such as styrene, acrylonitrile or alkyl methacrylate, it being necessary for the rubber character of the polymers polymerized on to be preserved.

These rubber-like polymers are thus polymerized onto the particles, that is to say physically or chemically bonded to them; polymers in which the rubbers polymerized on are not grafted or grafted to only a low degree but are fixed physically to the particle surfaces are preferred.

If the polymers in particle form according to the invention are graft polymers of a core (a) and a resin grafted-on shell (b), the core (a) preferably has an average particle diameter ($d_{50}$) of 0.09–0.5 $\mu$m and the weight ratio of core (a) to shell (b) is 10 to 80 to 90 to 20, in particular 20 to 80 to 80 to 20. The core material (a) is preferably crosslinked, in particular highly crosslinked, and preferably consists of a rubber based on dienes, olefines or alkyl acrylates.

The preferred material of the core (a) is a crosslinked rubber of one or more conjugated dienes, for example polybutadiene, or a copolymer of a conjugated diene with an ethylenically unsaturated monomer, such as Styrene and/or acrylonitrile, and a crosslinked acrylate rubber, in particular a Crosslinked polymer of acrylic acid alkyl esters, if appropriate mixed with up to 40% by weight of other vinyl monomers.

The suitable polymerizable acrylic acid esters include $C_1$–$C_8$-alkyl esters, for example methyl, ethyl, butyl, octyl and 2-ethylhexyl esters, halogenoalkyl esters, preferably $C_1$–$C_8$-halogenoalkyl esters, such as chloroethyl acrylate, and aromatic esters, such as benzyl acrylate and phenethyl acrylate. They can be used individually or as a mixture, and the mixture should contain at least one alkyl ester. Polyfunctional monomers are copolymerized for crosslinking. Examples are: esters of unsaturated carboxylic acids with a polyol (preferably 2 to 20 carbon atoms in the ester group), such as ethylene glycol dimethyl acrylate, esters of a polyfunctional carboxylic acid with an unsaturated alcohol (preferably 8 to 30 carbon atoms in the ester radical), triallyl cyanurate, triallyl isocyanurate and divinyl compounds, such as divinylbenzene; esters of unsaturated carboxylic acids with unsaturated alcohols (preferably 6 to 12 carbon atoms in the ester radical), such as allyl methacrylate; and phosphoric acid esters, for example triallyl phosphate, and 1,3,5-triacryloylhexahydro-s-triazine. Particularly preferred polyfunctional monomers are triallyl cyanurate, triallyl isocyanurate, triallyl phosphate, allyl methacrylate, ethylene glycol dimethacrylate and 1,3,5-triacrylloylhexahydro-s-triazine.

The grafted-on shell (b) is derived from the resin-forming monomers mentioned; this resin grafted-on shell (b) is thus at least partly grafted onto the core (a).

The invention furthermore relates to the use of the polymers in particle form, if appropriate as a mixture with brittle thermoplastic resins, as a thermoplastic moulding material: examples of suitable brittle resins are polyvinyl chloride, styrene/acrylonitrile copolymer, polystyrene and polymethyl methacrylate or $\alpha$-methylstyrene/acrylonitrile copolymers or terpolymers.

The polymers in particle form according to the invention can be employed in the form of powders to prepare these thermoplastic moulding materials: such a powder is usually melted together with the thermoplastic resin and this mixture is then processed by thermoplastic methods. It is also possible to mix the emulsion of the polymers in particle form according to the invention with suitable emulsions or dispersions of the brittle thermoplastic resins (for example styrene/acrylonitrile copolymer), to precipitate the components together and then to use them directly for thermoplastic processing.

The invention furthermore relates to a process for the preparation of the polymers and graft polymers in particle form; in which (1) resin-forming monomers are homo- or copolymerized or graft-polymerized onto a rubber from the series of diene, olefine and/or alkyl acrylate polymers in aqueous emulsion by polymerization initiated by free radicals, (2) after a polymerization conversion, based on the sum of the resin-forming monomers, of more than 90% by weight, a monomer or a monomer mixture which results in a rubber-like homo- or copolymer with glass transition temperatures of less than 30° C. is added in an amount of 1-10% by weight, based on the total reaction mixture, and (3) these monomers are polymerized on by free radical polymerization.

In the first stage of the process, resin-forming monomers are thus polymerized or graft-copolymerized in the conventional manner; this process is carried out in an aqueous emulsion, the resin-forming monomers being graft-copolymerized in the presence of one of the rubbers mentioned in the case of graft polymerization. These emulsion polymerizations can be carried out batchwise or continuously, using emulsifiers, regulating additives and polymerization initiators, in particular water-soluble initiators, at temperatures of 20°-100° C. and pH values of 12-2. A relatively large excess of emulsifier should thereby be avoided, especially in the final stage of the polymerization.

After a monomer conversion of more than 90%, preferably more than 94% and especially more than 98%, the monomers which form rubber-like homo- or copolymers are added and free radical polymerization is carried out, during which no further emulsifier or regulator should be added but initiator must be subsequently metered in, if necessary. Polymerization without the addition of further initiators, that is to say merely by addition of monomers, is preferred.

In this polymerization, the rubber-like polymer formed is fixed to the latex particle surface of the previously formed polymers, and any residual monomers of the polymerization in stage 1 are copolymerized. This fixing can be graft copolymerization or physical addition of the rubber-like polymer onto the surface of the previously formed particles. Particularly high quality polymers in the context of the invention are obtained if grafting is suppressed.

After polymerization of the monomers which form the rubber-like homo- or copolymers, polymers or graft polymers in particle form in the context of the invention are obtained in latex form (emulsion).

Such emulsions can be worked up after coagulation with acids, salts or bases, low temperature or heat or by spray-drying to powders; coagulation is preferably carried out at temperatures above 50° C. After purification of the coagulates, for example by washing, the moist polymers are dried to powders with improved properties in the context of the invention.

The emulsions, according to the invention, of polymers or graft polymers in particle form or the polymer powders according to the invention can be used in an outstanding manner for the preparation of thermoplastic moulding materials. For preparation of these, the polymers according to the invention can be processed directly as thermoplastics, volatile components being distilled off if appropriate and if appropriate with the addition of known antioxidants, lubricants, dyestuffs, pigments, flameproofing additives or antistatics or fillers.

On the other hand, mixtures of the polymers according to the invention can also be processed.

The polymers can, for example, also be processed as powders with other thermoplastics which are in the form of, for example, granules or powders, likewise as a mixture.

The known units, such as screws, extruders, colanders, kneaders and mills, can be used for thermoplastic processing.

Thermoplastic moulding materials which contain polymers according to the invention are distinguished by a high stability towards heat; an improved processability and improved mechanical properties are additionally observed.

The emulsions of the polymers in the context of the invention can furthermore be purified and dehydrated particularly easily during working up due to improved purification properties (on washing) and improved dehydration properties (for example in centrifuges or presses).

The powders obtained have increased bulk densities coupled with improved free-flowing properties, a low dust content, a good storage stability without forming lumps and uniform particle sizes.

EXAMPLES

Rubber used as the graft base

A: Aqueous emulsion of a styrene/butadiene copolymer with 35% by weight of copolymerized styrene and a solids content of 30% by weight; average particle diameter of the polymer: 0.11 μm ($d_{50}$ value); gel content of the polymer: 89% by weight.

Polymers according to the invention and comparison experiments

I: 1,715 parts by weight of water, 4 parts by weight of the Na salt of disproportionated abietic acid and 3 parts by weight of 1N sodium hydroxide solution are initially introduced into a reactor. The following monomer mixture is copolymerized at 80° C. by means of initiation with a solution of 4 parts by weight of potassium peroxidesulphate in 140 parts by weight of water: 483 parts by weight of α-methylstyrene, 777 parts by weight of methyl methacrylate, 140 parts by weight of acrylonitrile and 3.5 parts by weight of tert.-dodecylmercaptan, the following emulsifier solution being simultaneously fed into the reactor during the 6-hour metering time for the monomer mixture: 860 parts by weight of water, 25 parts by weight of the Na salt of disproportionated abietic acid and 18 of 1N sodium hydroxide solution.

After the end of the addition, the mixture is subsequently stirred at 89° C. for 4 hours; the monomer conversion is then 98% by weight.

The latex obtained is now further processed as follows:

| | |
|---|---|
| I.1 Polymerization is discontinued (comparison) | |
| I.2 Addition of a mixture of | 28 parts by weight of n-butyl acrylate |
| | 28 parts by weight of styrene |
| I.3 Addition of a mixture of | 30 parts by weight of n-butyl acrylate |
| | 26 parts by weight of styrene |
| I.4 Addition of a mixture of | 28 parts by weight of n-butyl acrylate |
| | 28 parts by weight of methyl |

| | | methacrylate |
|---|---|---|
| I.5 | Addition of a mixture of | 28 parts by weight of ethyl acrylate |
| | | 28 parts by weight of methyl methacrylate |

After the addition of the monomers (1.2 to 1.5), the mixture is after-polymerized at 80° C. for 2 hours.

After stabilization with 0.8 part by weight of phenolic antitoxidants, the latices are coagulated at 95°–98° C. by means of a 1:1 mixture of acetic acid an Mg sulphate.

The polymer slurry obtained is washed under constant conditions (until the wash water is free from electrolyte) on a laboratory centrifuge ($\phi$ 30 cm, 1,400 revolutions/minute, charged with 1,400 g of polymer dry weight) and centrifuged dry. The following values result; the bulk densities are determined after dehydration of the moist polymer material at 80° C.

| | Time until free from electrolyte | Bulk density of the dry powder (g/l) |
|---|---|---|
| I.1 | 3 hours | 190 |
| I.2 | 1 hour | 300 |
| I.3 | 1 hour | 290 |
| I.4 | 1 hour | 250 |
| I.5 | 1 hour | 295 |

II. 927 parts by weight of latex A and 643 parts of water are initially introduced into a reactor. Initiation is effected at 70° C. by means of potassium peroxydisulphate (5 parts by weight). The following streams are fed into the reactor at 70° C. in the course of 5 hours:

(1) 386 parts by weight of α-methylstyrene, 622 parts by weight of methyl methacrylate, 112 parts by weight of acrylonitrile and 1.5 parts by weight of tert.-dodecylmercaptan (2) 1,430 parts by weight of water, 25 parts by weight of the Na salt of disproportionated abietic acid and 20 parts by weight of 1N sodium hydroxide solution.

After the end of the addition, after-polymerization is carried out at 70° C. for 5 hours. The monomer conversion is 97%. Various batches are then after-treated as follows:

| II.1 | Polymerization is discontinued (comparison) |
|---|---|
| II.2 | Addition of a mixture of |
| | 32 parts by weight of n-butyl acrylate |
| | 24 parts by weight of styrene |
| II.3 | Addition of |
| | 56 parts by weight of ethyl acrylate |
| III.4 | Addition of |
| | 56 parts by weight of ethylhexyl acrylate |
| III.5 | Addition of |
| | 28 parts by weight of ethylhexyl acrylate |
| | 28 parts by weight of styrene |

After addition of the monomers (II.2 to II.5), the subsequent procedure is as in Examples I.2 to I.5. The following data result:

| | Time until free from electrolyte | Residual moisture after centrifuging dry | Bulk density (g/e) |
|---|---|---|---|
| II.1 | 1.5 hours | 72% by weight | 280 |
| II.2 | 0.5 hour | 59% by weight | 350 |
| II.3 | 0.5 hour | 60% by weight | 300 |
| II.4 | 0.4 hor | 60% by weight | 355 |

Moulding materials according to the invention and comparison experiments

PVC: PVC bulk polymer (Vestolit M6807 from Chem. Werke Huls), K value of the PVC is 68.

III: 50 parts by weight of PVC and 50 parts by weight of polymers II.1 to II.5 are compounded on a mill at 105° C. in the course of 10 minutes, using a lubricant (0.2 part of Loxiol G70) and stabilizers (1.5 parts of Irgastab 17M). Sheets 4 mm thick are then produced from the compound by pressing at 190° C. over a period of 10 minutes.

Another test series is compounded at 181° C. for 30 minutes. The crude colour of test pieces (sheets) produced therefrom is evaluated visually.

| Compound with | II.1 | II.2 | III.3 | II.4 | II.5 |
|---|---|---|---|---|---|
| Impact strength | n.b. | n.b. | n.b. | n.b. | n.b. |
| Notched impact strength (kg/m$^2$) | 5.5 | 7 | 7.5 | 7 | 7 |
| Distortion point Vicat B (°C.) | 94 | 95 | 94 | 95 | 94 |
| Heat stability comparison[(1)] after compounding for 10 minutes | + | ++ | ++ | + | ++ |
| after compounding for 30 minutes | − | + | ++ | ++ | ++ |

[(1)] ++ no discoloration
+ almost no discoloration
clear discoloration
n.b. = not broken IV. Properties of the graft polymers as a thermoplastic Thermoplastic properties of the graft polymers Graft polymers II.1 to II.5 are processed as thermoplastics at 220° C. with the addition of 0.2 part of Loxiol G70. The injection moulded articles have the following characteristics:

| Product | II.1 | II.2 | II.3 | II.4 |
|---|---|---|---|---|
| Ball indentation hardness (MPA 30") | 98 | 97 | 98 | 97 |
| Impact strength (kg/m$^2$) | 52 | 70 | 68 | 72 |
| Vicat B (°C.) | 110 | 110 | 110 | 110 |
| MFI value (220° C./10 kg) | 14 | 19 | 20 | 20 |

Appendix to the measurement methods used in the text d$_{50}$ values are average particle diameters determined by ultracentrifuge measurement, in this context see: W. Scholtan et al. Colloids Z. Polymere, 250 (1972), pages 783–796

Ball indentation hardness, determined in accordance with DIN 53 456

Impact strength, determined in accordance with DIN 53 453

Notched impact strength, determined in accordance with DIN 53 453

Heat distortion point, determined in accordance with DIN 53 460

MFI value, determined in accordance with DIN 53 735

What is claimed:

1. A particulate polymer consisting essentially of 90 to 99% by weight of a particulate core having a resin surface selected from a homo- or copolymer of resin forming monomers or a graft polymer comprising (a) a diene, olefin, alkyl acrylate rubber or mixtures thereof core and (b) a homo- or copolymer of resin-forming monomers shell and 10 to 1% by weight of a rubber-like homo- or copolymer, with a glass transition temperature of less than 30° C., graft polymerized onto the resin surface.

2. A particulate polymer according to claim 1, wherein the core is a homo- or copolymer of resin-forming monomers.

3. A particulate polymer according to claim 1, wherein the core is a graft polymer comprised of (a) a diene, olefin, alkyl acrylate rubber or mixture thereof core and (b) a homo- or copolymer of resin-forming monomers shell.

4. A particulate polymer according to claim 1 having an average particle diameter ($d_{50}$ value) of 0.08 to 1.5 µm.

5. A particulate polymer according to claim 1, comprising 93 to 99% by weight of the core and 7 to 1% by weight of the rubber-like homo- or copolymer and having an average particle diameter ($d_{50}$ value) of 0.09 to 0.6 µm.

6. A particulate polymer according to claims 1, 2, 3, 4 or 5, comprising 96 to 99% by weight of the core and 4 to 1% by weight of the rubber-like homo- or copolymer.

7. A particulate polymer according to claims 1, 2, 3, 4 or 5, in which the resin-forming monomers are selected from the group consisting of styrene, α-methylstyrene, p-methylstyrene, methacrylic acid alkyl esters, acrylonitrile, methacrylonitrile, maleimide and mixtures thereof.

8. A particulate polymer according to claim 1, wherein rubber-forming monomers alkyl acrylate, diene and carboxylic acid vinyl ester monomers mixed with zero to 50% by weight of styrene, acrylonitrile or alkyl methacrylate monomers, based on the sum of rubber-forming monomers, are used to form the rubber-like homo- or copolymer.

9. A particulate polymer according to claim 1, wherein the rubber-forming monomers are $C_1$ to $C_8$ alkyl acrylate, butadiene, isoprene, chloroprene, or mixtures thereof.

10. A particulate polymer according to claim 1, wherein the rubber-forming monomers are mixed with zero to 30% by weight of styrene, acrylonitrile or alkyl methacrylate.

11. A free flowing particulate polymer in powder form having a uniform particle size and consisting essentially of, 90 to 99% by weight of a particulate core comprising a crosslinked acrylate rubber and 10 to 1% by weight of a rubber-like copolymer, having a glass transition temperature of less than 30° C., graft polymerized onto the particulate core.

12. A particulate polymer according to claim 11 having an average particle diameter ($d_{50}$ value) of 0.08 to 1.5 µm.

13. A particulate polymer according to claim 11, consisting essentially of 93 to 99% by weight of the particulate core and 7 to 1% by weight of the rubber-like copolymer where the particulate polymer has an average particle diameter ($d_{50}$ value) of 0.09 to 0.6 m.

14. A particulate polymer according to claims 11, 12 or 13, consisting essentially of 96 to 99% by weight of the particulate core and 4 to 1% by weight of the rubber-like copolymer.

15. A particulate polymer according to claims 11, 12 or 13 in which the resin-forming monomers are selected from the group consisting of styrene, α-methylstyrene, p-methylstyrene, methacrylic acid alkyl ester, acrylonitrile, methacrylonitrile, maleimide and mixtures thereof.

16. A particulate polymer according to claim 11, wherein the rubber-like copolymer-forming monomers are alkyl acrylate, diene and carboxylic acid vinyl ester monomers mixed with zero to 50% by weight of styrene, acrylonitrile or alkyl methacrylate monomers, based on the sum of rubber-like copolymerforming monomers.

17. A particulate polymer according to claim 11, wherein the rubber-like copolymer-forming monomers are $C_1$ to $C_8$ alkyl acrylate, butadiene, isoprene or chloroprene.

18. A particulate polymer according to claim 11, wherein the rubber-like copolymer-forming monomers are mixed with zero to 30% by weight of styrene, acrylonitrile or alkyl methacrylate.

19. A process for the production of a particulate polymer according to claim 11 in which (1)—the crosslinked acrylate rubber is polymerized in aqueous emulsion by polymerization initiated by free radicals, (2)—after a polymerization conversion of more than 90%, based on the sum of the monomers used to form said rubber, monomers which form the rubber-like copolymer are added and (3)—the rubber-like copolymer-forming monomers are polymerized by free radical polymerization.

* * * * *